US006777075B2

(12) United States Patent
Concannon et al.

(10) Patent No.: US 6,777,075 B2
(45) Date of Patent: Aug. 17, 2004

(54) BURNISH RESISTANT PRINTING SHEETS

(75) Inventors: Paul W. Concannon, Westbrook, ME (US); Paul Durocher, Scarborough, ME (US); Joseph M. Fernandez, Buxton, ME (US); Lisa A. Gubrud, Scarborough, ME (US); Thomas A. Waecker, Cape Elizabeth, ME (US)

(73) Assignee: S.D. Warren Services Company, Boston, MA (US)

( * ) Notice: Subject to any disclaimer, the term of this patent is extended or adjusted under 35 U.S.C. 154(b) by 111 days.

(21) Appl. No.: 10/098,917

(22) Filed: Mar. 15, 2002

(65) Prior Publication Data

US 2003/0175501 A1 Sep. 18, 2003

(51) Int. Cl.[7] ......................... B32B 23/18; B32B 27/08; B32B 27/18; B32B 27/20; B32B 27/32

(52) U.S. Cl. ........................ 428/327; 428/323; 428/195; 428/206; 428/212; 428/217; 428/219; 428/340; 428/500; 428/521; 428/522; 428/523; 428/532; 428/533; 428/402; 428/141

(58) Field of Search ................................. 428/323, 327, 428/195, 206, 212, 217, 500, 521, 522, 523, 532.5, 478.2, 478.4, 478.8, 533, 402, 141, 219, 340, 332, 532

(56) References Cited

U.S. PATENT DOCUMENTS

| | | | |
|---|---|---|---|
| 3,779,800 A | 12/1973 | Heiser |
| 4,134,872 A | 1/1979 | Lee |
| 4,198,471 A | 4/1980 | Nelson |
| 4,258,104 A | 3/1981 | Lee et al. |

(List continued on next page.)

FOREIGN PATENT DOCUMENTS

| | | |
|---|---|---|
| CA | 2153128 | 6/1996 |
| DE | 19524528 | 1/1996 |
| EP | 0709221 | 1/1996 |
| GB | 1465631 | 2/1977 |
| JP | 01011789 | 1/2001 |
| WO | WO 99163157 A1 | 12/1999 |

OTHER PUBLICATIONS

Anonymous, All–Latex Coatings for Paper and Paperboard, Research Disclosure 39524, 157–158, Mar. 1997.

Heiser, E.J. and Shand A., Lightweight Polymeric Pigment, Tappi Journal, Jan. 1973, vol. 56, No. 1.

Heiser, E.J. and Shand A., Lightweight Polymeric Pigment, Tappi Journal, Feb. 1973, vol. 56, No. 2.

Wakai, C., Morii, H. ,and Fujiwara, H., A Novel Technology To Produce Ultra High Gloss Coated Paper, Tappi Coating Conference and Trade Fair Proceedings, 2000, pp. 397–404.

Queslel & Mark, "Elasticity, Rubber–like", Encyl. of Polymer Science & Technology, Oct. 22, 2001, John Wiley & Sons, Internet, XP–002242297.

Bicerano, "Glass Transition", Encyl. of Polymer Science & Technology, Oct. 22, 2001, John Wiley & Sons, Internet, XP–002242318.

*Primary Examiner*—Vivian Chen
(74) *Attorney, Agent, or Firm*—Briana K. O'Regan

(57) ABSTRACT

A coated printing sheet is provided that is suitable for conventional offset printing grades, exhibiting desirable surface and optical properties and providing a surface that is image receptive and resistant to coating failure. The coated printing sheet includes an image receptive coating containing a hard polymer pigment having a shear modulus of at least $5.0 \times 10^9$ dynes/cm$^2$ and a film forming binder. The coated printing sheets resist burnishing and exhibit desirable properties, e.g., gloss, bulk, stiffness and smoothness, with minimal or no calendering.

27 Claims, 1 Drawing Sheet

U.S. PATENT DOCUMENTS

| | | | |
|---|---|---|---|
| 4,317,849 | A | 3/1982 | Ogura et al. |
| 4,370,389 | A | 1/1983 | Ogura et al. |
| 4,468,498 | A | 8/1984 | Kowalski et al. |
| 4,478,974 | A | 10/1984 | Lee et al. |
| 4,567,099 | A | 1/1986 | Van Gilder et al. |
| 4,613,633 | A | 9/1986 | Sekiya et al. |
| 5,118,533 | A | 6/1992 | Saji et al. |
| 5,169,715 | A | 12/1992 | Maubert et al. |
| 5,215,812 | A | 6/1993 | Kano et al. |
| 5,308,890 | A | 5/1994 | Snyder |
| 5,344,675 | A | 9/1994 | Snyder |
| 5,360,657 | A | 11/1994 | Kano et al. |
| 5,521,253 | A | 5/1996 | Lee et al. |
| 5,618,859 | A | 4/1997 | Maeyama et al. |
| 5,869,569 | A | 2/1999 | Arai et al. |

BURNISH RESISTANT PRINTING SHEETS

BACKGROUND OF THE INVENTION

The present invention relates to a coated printing sheet. The present invention further relates to methods of manufacturing such a coated printing sheet.

Coated printing papers are typically required to meet many product attribute and performance characteristics. The surface finish, e.g., glossy, dull or matte, and related product quality characteristics of a coated printing sheet are generally dictated by the end use. For example, printed material comprising primarily text is typically printed on paper having a dull or matte finish which facilitates reading; conversely, printed material comprising mostly images, such as magazines, is generally printed on paper having a very glossy finish which tends to accentuate the images.

High quality coated printing papers, regardless of surface finish, are required to meet certain optical properties to ensure that the final printed product exhibits the desired image quality. High quality printing sheets tend to exhibit high brightness which accentuates the color reproduction of the printed images. Because most printing sheets are printed on both sides, the opacity of the printing sheet should be sufficient to reduce show-through of printed text or images from one side of the sheet to the other side.

Other product attributes may affect the performance characteristics of the printing sheet. Smoothness of the sheet tends to enhance the reproduction of images and the clarity of text. Coated printing sheets should exhibit an adequate level of porosity to absorb ink solvents, and in the case of offset lithography, the fountain solution. Coated printing sheets should exhibit a sufficient level of strength and stiffness to withstand printing and any subsequent finishing processes, such as trimming and binding. Printers typically demand printing sheets with relatively high bulk and stiffness to maintain printing press runnability.

Manufacturers of high quality printing sheets generally employ some form of calendering after coating to achieve an appropriate level of paper gloss and smoothness. Increased levels of calendering tend to produce higher gloss and greater smoothness. However, calendering also tends to reduce opacity, stiffness and bulk. Thus, efforts to improve gloss and smoothness through calendering can negatively affect the properties printers desire for runnability.

In addition, high levels of calendering can cause undesirable mottling problems in the paper product and in the final printed image. There are several types of mottling problems, i.e., microgloss and backtrap mottle, which are related to nonuniformities in the paper web. Calendering magnifies these nonuniformities, thereby negatively affecting paper surface quality and final printed image quality. Consequently, paper manufacturers tend to select calendering conditions that optimize certain properties and minimize aesthetically undesirable effects; in doing so other desirable properties are often sacrificed.

Typically, printing papers designed to exhibit low levels of gloss, such as dull or matte grades of paper, are not calendered or are calendered very lightly. Uncalendered printing sheets are particularly susceptible to burnishing, i.e., localized areas of increased gloss or reflectivity on the surface of the sheet typically caused by mechanical rubbing. Uncalendered printing sheets also tend to exhibit greater levels of porosity, which may exacerbate a variety of printing problems if the ink solvent or carrier drains too quickly into the coated surface layer. An overcoat varnish may be applied after printing to protect the paper surface and minimize burnishing but such steps typically add manufacturing complexity and undesirable cost to the final printed product.

To avoid the deleterious effect of calendering, the use of all-latex coatings has been proposed for glossy sheets. Because an all-latex coating tends to form a continuous film on the surface of the sheet, surface gloss tends to be very high. The porosity of such latex coated sheets, however, tends be very low which results in increased ink setting, i.e., the amount of time necessary for the ink on the surface of the coating to dry, or set, sufficiently to allow physical handling, which tends to reduce the quality of the final printed image and to create production inefficiencies. Such glossy sheets also tend to exhibit burnishing.

There remains a need for an offset printing sheet that exhibits the product attributes desired by printers and publishers without the aesthetically undesirable effects discussed above. Specifically there remains a need for an offset printing sheet that exhibits the product attributes typically achieved through calendering without the negative effects of calendering. In addition, there remains a need for an uncalendered printing sheet that does not exhibit the undesirable characteristics of uncalendered sheets, such as burnishing and high porosity.

SUMMARY OF THE INVENTION

The inventor has discovered that including a hard polymer pigment having a shear modulus of at least $5.0\times10^9$ dynes/$cm^2$ and a film forming binder in an image receptive coating provides a printing sheet that exhibits the surface and optical properties expected for conventional offset printing grades, and provides a surface that is image receptive and resistant to coating failure or picking, i.e., localized delamination of the coating layer from the underlying substrate, during the manufacturing process and/or during printing. The term "shear modulus," as used herein, means the elastic, or storage, modulus of polymeric material as determined by dynamic mechanical analysis, measured at approximately room temperature, e.g., 21° C. The coated printing sheets resist burnishing, i.e., localized areas of increased gloss or reflectivity on the surface of the sheet typically caused by mechanical rubbing. Without intending to be bound by any particular theory, the burnish resistance appears to be related to the resistance to deformation exhibited by the hard polymer pigment particles. Generally, the coated printing sheets exhibit desirable properties, e.g., gloss, bulk, stiffness and smoothness, with minimal or no calendering.

Preferably the image receptive coating of the printing sheets provides sufficient ink drainage or ink setting, i.e., a proportion of the ink solvent carrier drains into the image receptive coating such that the ink on the surface of the coating dries, or sets, sufficiently to allow physical handling of the printed sheet within a relatively short period of time, e.g., 30 to 45 minutes. Ink setting is distinguished from true ink drying which is caused by the complete removal of the solvent and the resulting oxidation of the ink. The coating of the coated printing sheets also exhibits sufficient ink transfer, i.e., absorption of the ink-fountain solution mixture by the image receptive surface is such that a uniform film of ink is transferred from the printing blanket to the sheet during offset printing, and sufficient ink holdout, i.e., the printing ink remains on the surface of the coating. Ink setting, ink transfer and ink holdout affect final product attributes such as the ink gloss and sharpness of the printed image.

In one aspect, the invention provides a printing sheet including a substrate and, on at least one surface of the substrate, an image receptive coating including a film forming binder and a hard polymer pigment having a shear modulus of at least $5.0\times10^9$ dynes/cm$^2$.

Preferred embodiments may include one or more of the following features. The hard polymer pigment has a shear modulus of at least $10.0\times10^9$ dynes/cm$^2$. The hard polymer pigment is essentially non-film forming and remains in the form of discrete roughly spherical solid particles. The hard polymer pigment has a glass transition temperature ($T_g$) of at least 80° C., preferably at least 105° C. The hard polymer pigment is selected from the group consisting of poly (methyl methacrylate), poly(2-chloroethyl methacrylate), poly(isopropyl methacrylate), poly(phenyl methacrylate), polyacrylonitrile, polymethacrylonitrile, polycarbonates, polyetheretherketones, polyimides, acetals, polyphenylene sulfides, phenolic resins, melamine resins, urea resins, epoxy resins, and alloys, blends, mixtures and derivatives thereof. The hard polymer pigment has a homogenous composition comprising poly(methyl methacrylate) particles. The hard polymer pigment particles have a particle size of less than about 2,000 angstroms (Å), preferably less than about 1,500 Å, more preferably a particle size ranging from about 600 to 1,200 Å. The image receptive coating includes at least 30 parts by weight of the hard polymer pigment, preferably at least 50 parts, more preferably at least 80 parts, based on 100 parts by weight of total pigment. The term "parts," as used herein, means parts on a dry solids basis, and, as is well known in the art, parts are based on 100 parts of pigment. The film forming binder is selected from the group consisting of latex, starch, polyacrylate salt, polyvinyl alcohol, soy, casein, carboxymethyl cellulose, hydroxymethyl cellulose and mixtures thereof. Preferably the film forming binder is a latex selected from the group consisting of styrene-butadiene, styrene-butadiene-acrylonitrile, styrene-acrylic, styrene-butadiene-acrylic and mixtures thereof. The image receptive coating includes 5 to 75 parts by weight of film forming binder, based on 100 parts by weight of total pigment. The image receptive coating further includes a pigment selected from the group consisting of structured polymer pigment, kaolin, calcined clay, structured clay, ground calcium carbonate, precipitated calcium carbonate, titanium dioxide, aluminum trihydrate, satin white, hollow sphere plastic pigment, solid plastic pigment, silica, zinc oxide, barium sulfate and mixtures thereof. The image receptive coating further includes a structured polymer pigment consisting of a soft domain having a glass transition temperature of less than about 50° C. and a hard domain having a glass transition temperature of greater than about 55° C. The image receptive coating has a total dried coat weight per side of about 1 to 4 g/m$^2$.

The substrate, prior to application of the image receptive coating, has a smoothness of less than about 3.5 $\mu$m, preferably less than about 2.0 $\mu$m, more preferably less than about 1.5 $\mu$m. The printing sheet further includes at least one precoat layer on the first surface of the substrate underlying the image receptive coating layer. The precoat layer includes a binder and a pigment selected from the group consisting of kaolin, calcined clay, structured clay, ground calcium carbonate, precipitated calcium carbonate, titanium dioxide, aluminum trihydrate, satin white, hollow sphere plastic pigment, solid plastic pigment, silica, zinc oxide, barium sulfate and mixtures thereof. The pigment component of the precoat has a monodisperse particle size distribution. Preferably the monodisperse pigment is selected from the group consisting of precipitated calcium carbonate, hollow sphere plastic pigment and mixtures thereof. The precoat layer has a total dried coat weight per side of about 5 to 15 g/m$^2$.

In another aspect, the invention features a printing sheet including a substrate and, on at least one surface of the substrate, an image receptive coating including a film forming binder and a hard polymer pigment, wherein the hard polymer pigment is essentially non-film forming and remains in the form of discrete roughly spherical solid particles.

In another aspect, the invention provides a method of manufacturing a printing sheet including:

a) applying an image receptive coating, including a hard polymer pigment having a shear modulus of at least $5.0\times10^9$ dynes/cm$^2$ and a film forming binder, to at least a first surface of a substrate; and
b) drying the image receptive coating layer.

Preferred methods may include one or more of the following features. The hard polymer pigment has a shear modulus of at least $10.0\times10^9$ dynes/cm$^2$. A pressing step is performed on the substrate before the application of the image receptive coating at a moisture level ranging from 20 to 60% and at a temperature of at least 100° C. A precoating step and a precoat drying step are performed before application of the image receptive coating. A calendering step is performed before the application of the image receptive coating. A calendering step is performed after the image receptive coating drying step, preferably at a nip pressure ranging from 40 to 90 kN/m and a paper surface temperature of at least 5° C. lower than the glass transition temperature of the hard polymer pigment. A brushing step is performed after the image receptive coating drying step.

Other features and advantages of the invention will be apparent from the following detailed description, the drawing, and the claims.

DETAILED DESCRIPTION OF PREFERRED EMBODIMENTS

Preferably the image receptive coating of the printing sheets of the invention includes a hard polymer pigment having a shear modulus of at least $5.0\times10^9$ dynes/cm$^2$ and a film forming binder.

Suitable hard polymer pigments exhibit a shear modulus of at least $5.0\times10^9$ dynes/cm$^2$, preferably at least $10.0\times10^9$ dynes/cm$^2$. The shear modulus exhibited by suitable hard polymer pigments generally allows the particles to resist deformation during the paper manufacturing process. The resistance to deformation appears to be related to the burnish resistance exhibited by the printing sheets of the invention.

The hard polymer pigment particles in the image receptive coating layer are essentially non-film forming and typically remain in the form of discrete roughly spherical solid particles in the image receptive coating layer throughout the paper manufacturing process and in the final printing sheet product. The term "essentially non-film forming," as used herein, means that the hard polymer particles will not form a continuous film under the temperature conditions used to dry the image receptive layer. A suitable hard polymer pigment typically exhibits a glass transition temperature of at least 80° C., preferably at least 105° C., exceeding the highest temperature to which the coating will be subjected during the manufacturing process. The non-film forming nature of the hard polymer pigment is in part a consequence of the relatively high glass transition temperature.

Figure 1:
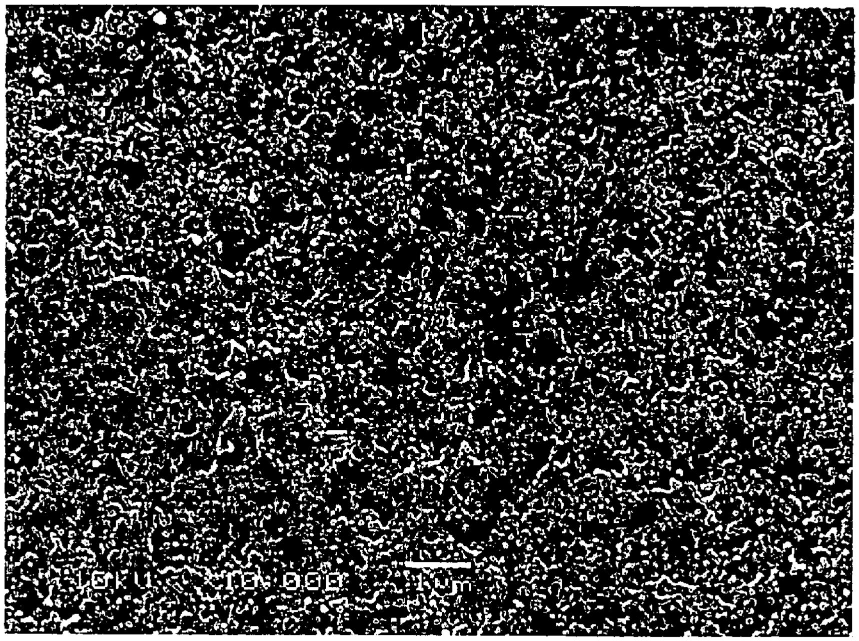
FIG. 1 is an SEM photomicrograph of a top view of the image receptive surface of an embodiment of the invention.

In addition, the hard polymer pigment particles typically remain in the form of discrete roughly spherical solid particles because they tend to be resistant to deformation under the pressures encountered during the manufacture of the printing sheet. FIG. 1 is an SEM photomicrograph of the image receptive surface of a printing sheet of the invention, containing hard polymer pigment as the sole pigment. The hard polymer pigment particles are clearly visible as discrete roughly spherical particles in FIG. 1.

It is advantageous that the hard polymer pigment be non-film forming because it functions as a pigment in the image receptive coating. This non-film forming characteristic allows the hard polymer pigment to provide smoothness to the final dried coating layer without the need for calendering as well as sufficient porosity for satisfactory ink setting. Because the hard polymer pigment particles typically remain in the form of discrete roughly spherical particles, the resulting coating layer is discontinuous, providing the porosity necessary for satisfactory ink setting. The discontinuous nature of the image receptive coating layer is evident in FIG. 1.

Suitable hard polymer pigments may have a homogeneous or heterogeneous composition including, for example, hard acrylic resins (e.g., poly(methyl methacrylate) (PMMA), poly(2-chloroethyl methacrylate), poly(isopropyl methacrylate), poly(phenyl methacrylate), polyacrylonitrile, polymethacrylonitrile, etc.), polycarbonates, polyetheretherketones (PEEK), polyimides, acetals, polyphenylene sulfides, and alloys, blends and derivatives thereof, and certain hard polymer resins such as phenolic resins, melamine resins, urea resins, and epoxy resins. A hard polymer pigment may take the form of a heterogeneous structured polymer pigment as described below provided the structured polymer pigment exhibits a shear modulus of at least $5.0\times10^9$ dynes/cm$^2$.

Preferably the hard polymer pigment includes hard acrylic resins, more preferably PMMA. Suitable PMMA pigments are commercially available from Specialty Polymers, Inc. located in Oregon, e.g., H30S-PC.

Hard homogeneous polymer pigments are typically prepared by emulsion polymerization. Hard heterogeneous polymer pigments are typically prepared in a sequential or staged emulsion process in which a first polymer is initially prepared in a first-stage emulsion polymerization. Thereafter, a second polymer is formed in a second-stage emulsion polymerization in the presence of the first polymer resulting from the first-stage polymerization. The methods of manufacture of homogeneous and heterogeneous polymers are known in the art, e.g., as disclosed in U.S. Pat. Nos. 4,478,974, 4,134,872, 5,308,890 and 4,613,633, the disclosures of which are incorporated herein by reference.

The particle size of preferred hard polymer pigments is generally within the size range typically used for pigments in image receptive coatings. Preferably, the particle size of hard polymer pigments ranges from less than about 2,000 angstroms (Å), more preferably less than about 1,500 Å, most preferably about 600 to 1,200 Å. Hard polymer pigments having smaller particle size tend to improve gloss and smoothness, thereby reducing or eliminating the need for calendering. Hard polymer pigments having particle sizes greater than about 1,500 Å tend to result in reduced paper gloss but generally maintain desired levels of ink gloss and smoothness. Thus, hard polymers pigments having particle sizes greater than about 1,500 Å may be used when reduced gloss levels are desired, e.g., dull or matte grades of paper.

The hard polymer pigment may be used as the sole pigment in the image receptive layer or it may be used with other organic or inorganic pigments. The image receptive coating generally includes at least 30 parts by weight of the hard polymer pigment, based on 100 parts by weight of total pigment. Preferably, the image receptive coating includes at least 50 parts by weight, more preferably at least 80 parts by weight, based on 100 parts by weight of total pigment.

The film forming binder component of the image receptive coating may include latex, starch, polyacrylate salt, polyvinyl alcohol, protein (e.g., soy, casein), carboxymethyl cellulose, hydroxymethyl cellulose and mixtures thereof. Suitable starches include pearl, ethylated, oxidized or enzyme treated starch, all of which may be derived from potato, corn, rice or tapioca starches. Preferably the coating binder is a latex. Typical monomers used in the production of latex polymers for paper coatings include styrene, butadiene, acrylonitrile, butyl acrylate, methyl methacrylate, vinyl acrylate, isoprene and combinations thereof. Preferred latexes include styrene-butadiene, styrene-butadiene-acrylonitrile, styrene-acrylic, styrene-butadiene-acrylic and mixtures thereof.

Preferably the amount of film forming binder in the coating is about 5 to 75 parts by weight based on 100 parts of pigment. The amount of binder in the coating should provide adequate coating strength to resist picking. The mean particle size of the latex particles typically used as film forming binders for the manufacture of coated printing sheets is generally about 800 to 2,400 angstroms. Coatings with smaller latex particles typically exhibit improved coating strength because smaller particles provide a greater surface area per unit weight with which to bind the other coating components. Examples of suitable latexes include: CP 620NA and CP 615NA, manufactured by The Dow Chemical Company; GenFlo 557 and GenFlo 576, manufactured by Omnova Solutions Inc.; and Acronal S 504 and Acronal S 728, manufactured by BASF Corporation.

The image receptive coating may further include structured polymer pigment particles in addition to the hard polymer pigment. As discussed above, the hard polymer pigment may also take the form of a heterogeneous structured polymer pigment provided the structured polymer pigment exhibits a shear modulus of at least $5.0\times10^9$ dynes/cm$^2$. However, if the structured polymer pigment is used in addition to the hard polymer pigment, it may have any desired level of shear modulus.

The structured polymer pigment particles are broadly characterized as generally heterogeneous, having a portion thereof comprising an essentially film forming "soft" polymer domain and having a portion thereof comprising an essentially non-film forming "hard" polymer domain. As used herein, the term "domain" refers to discrete regions within the heterogeneous polymer which are either the soft polymer or the hard polymer. As used herein, the term "essentially film forming" denotes the property of the soft polymer to form a continuous film under the temperature conditions used to dry coating compositions coated on a substrate.

When the structured polymer pigment is used as an additive to the image receptive coating, it is advantageous that the structured polymer pigment be non-film forming because it functions as a pigment in the image receptive coating. This non-film forming characteristic allows the structured polymer pigment to provide smoothness to the final dried coating layer without the need for calendering as well as sufficient porosity for satisfactory ink setting. Without intending to be bound by a particular theory, the ability to provide smoothness without calendering and porosity appears to be related to limited coalescence of the structured polymer pigment when subjected to typical drying conditions after coating. The term "limited coalescence" as used herein, means that, during the drying process, the non-film forming hard domains of the structured polymer particles maintain their structure while the film forming soft domains of the particles coalesce. Because the structured polymer pigment particles typically remain in the form of discrete roughly spherical particles, the resulting coating layer is discontinuous, providing the porosity necessary for satisfactory ink setting. Greater porosity also tends to improve the ability of moisture within the printing sheet to escape during web printing. When moisture cannot escape rapidly, blistering, i.e., disruptions in the printed image caused by the delamination of the coating layer from the underlying substrate, may result.

Typical synthetic polymer latexes completely coalesce during drying or calendering, forming a continuous film. Complete coalescence, or complete film formation, tends to cause a decrease in porosity which in turn increases ink setting time.

The extent of coalescence of a coating containing a structured polymer pigment may be measured indirectly by measuring porosity, a broad term used to indicate both air permeance, i.e., amount of air that flows through a paper specimen using the Sheffield method, and air resistance, i.e., the amount of time it takes a specific volume of air to pass through a given surface area using the Gurley method. Increased levels of coalescence tend to cause decreases in Sheffield porosity of the coating. Higher Sheffield values indicate higher porosity while higher Gurley values indicate lower porosity. Photomicrographs may provide a qualitative indication of porosity and, consequently, an indication of the extent of coalescence. An indication of the limited coalescence may also be derived from ink absorption tests, e.g., K&N ink absorption test. Increased coalescence tends to result in reduced K&N ink absorption.

The distribution within a heterogeneous structured polymer pigment particle of the soft polymer domain and the hard polymer domain can vary. For example, the heterogeneous particle may have only two distinct regions, e.g., mutually exclusive hemispherical soft and hard regions. On the other hand, the heterogeneous particle may have multiple regions of one or both components. For example, a generally spherical continuous region of one polymer may have several discrete regions of the other polymer dispersed in, or residing on the surface of, the continuous region. Alternatively, the heterogeneous particle may have an essentially continuous web-like region of one polymer that has its interstices filled with the other polymer. The structured polymer pigment particle may also exhibit a core/shell morphology, i.e., the core polymer is encapsulated within the shell polymer, the particles having one core or a multiplicity of cores.

Preferably, the distribution within the heterogeneous structured polymer pigment is such that the hard polymer domain is in the form of a continuous matrix having discrete regions of the soft polymer domain dispersed within such hard matrix and/or distributed on the surface thereof.

The amount of the hard domain regions in 100 parts by weight of the heterogeneous structured polymer pigment particles is from about 55 to 90 parts by weight, preferably from about 60 to 70 parts by weight. The amount of the soft domain regions in 100 parts by weight of the heterogeneous structured polymer pigment particles is from about 10 to 45 parts by weight, preferably from about 30 to 40 parts by weight. If the amount of the hard domain regions in the structured polymer pigment is greater than about 90 parts by weight, the structured polymer pigment may not exhibit adequate film forming characteristics, and the image receptive coating layer tends to be too porous. If the amount of the soft domain regions in the structured polymer pigment is greater than about 45 parts by weight, the structured polymer pigment tends to exhibit the film forming characteristics of conventional latexes and the image receptive coating layer tends to exhibit complete coalescence.

Each domain of the structured polymer pigment exhibits a distinct glass transition temperature ($T_g$), i.e., second order thermodynamic transition temperature of a semicrystalline polymer wherein the polymer transitions from a glass state to a rubbery state. Consequently, structured polymer pigments suitable for use in the invention exhibit multiple glass transition temperatures. Preferably, the structured polymer pigment exhibits at least two distinct glass transition temperatures, corresponding to the hard and soft domains of the structured polymer pigment.

The $T_g$ of the soft polymer domain may be higher or lower than the highest temperature to which the coating will be subjected during the manufacturing process. Preferably at least one $T_g$ of the structured polymer particle, exhibited by the soft polymer domain, should be lower than the highest temperature to which the coating will be subjected during the manufacturing process, preferably at least 10° C. lower, to provide additional coalescence to the image receptive coating beyond that which is provided by the binder component alone. For example, if the surface temperature of the paper web in a particular process reaches 80° C., the $T_g$ of the hard domain should exceed 80° C., preferably exceed 85° C., and the $T_g$ of the soft domain should be lower than 80° C., preferably below 70° C. In this manner, the soft domain of the structured polymer pigment ensures that some coalescence occurs during drying, while the hard domain of the structured polymer pigment ensures that the discrete particulate form is maintained. Thus, the coalescence of the structured polymer pigment is limited and the resulting image receptive coating layer is discontinuous.

The structured polymer pigment particles may include one or more distinct hard polymer domains and one or more distinct soft polymer domains. Each hard and soft domain typically exhibits a Tg. Thus, the structured polymer pigment may exhibit more than two $T_g$'s if it includes more than one hard and/or soft polymer domain.

The structured polymer pigments used in the invention are advantageously prepared in a sequential or staged emulsion process in which a polymer of either of the aforementioned soft or hard domains is initially prepared in a first-stage emulsion polymerization. Thereafter, the remaining hard or soft domain is formed in a second-stage emulsion polymerization in the presence of the hard or soft polymer resulting from the first-stage polymerization. The methods of manufacture of structured polymers are known in the art, e.g., as disclosed in U.S. Pat. Nos. 4,478,974, 4,134,872, 5,308,890 and 4,613,633, the disclosures of which are incorporated herein by reference.

Monomers used for the production of the soft domain of the structured polymer pigment include, for example, aliphatic conjugated diene monomers such as 1,3-butadiene, 2-methyl-1,3-butadiene, 2,3-dimethyl-1,3-butadiene, 1,3-pentadiene; 2-neopentyl-1,3-butadiene and other hydrocarbon analogs of 1,3-butadiene, and, in addition, the substituted 1,3-butadienes, such as 2-chloro-1,3-butadiene, 2-cyano-1,3-butadiene; substituted conjugated pentadienes; conjugated hexadienes, and mixtures thereof; isoprene; and acrylic acid esters such as methyl acrylate, ethyl acrylate, butyl acrylate and 2-ethylhexyl acrylate. These monomers may be used singly or in combination.

Monomers used for the production of the hard domain of the structured polymer pigment include, for example, monovinylidene aromatic monomers such as styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene; methacrylic or chloroacrylic acid esters such as methyl methacrylate, ethyl methacrylate, isopropyl methacrylate, phenyl methacrylate, cyclohexyl methacrylate, 2-chloroethyl methacrylate, methyl chloroacrylate, ethyl chloroacrylate and butyl chloroacrylate; ethylenic nitrile compounds such as acrylonitrile and methacrylonitrile; vinyl chloride; and unsaturated carboxylic acids, or esters or sodium or ammonium salts thereof, such as acrylic acid, methacrylic acid, crotonic acid, cinnamic acid, itaconic acid, fumaric acid, maleic acid, butenetricarboxylic acid, and monobutyl itaconate. These monomers may be used singly or in combination. Monomers yielding film forming polymers, e.g., aliphatic conjugated diene monomers such as 1,3-butadiene, 2-methyl-1,3-butadiene and 2-chloro-1,3-butadiene, and acrylic acid esters such as methyl acrylate, ethyl acrylate, butyl acrylate and 2-ethylhexyl acrylate, can also be used if the copolymerization thereof with the aforementioned monomers gives copolymers which do not form a film at the highest temperature to which the image receptive coating will be subjected during the manufacturing process.

The selection of appropriate polymers for the domains of the structured polymer pigment depends on the final printing properties desired. For example, to slow down ink setting on the image receptive coating, which tends to be caused by rapid drainage of the ink solvent into the coating, one or more of the polymeric constituents of the structured polymer may incorporate a monomer, e.g., acrylic acid, which interacts to a lesser degree with the ink solvents.

As discussed above, when the hard polymer pigment is a heterogeneous structured polymer pigment, the composition of the hard and soft domains of the structured polymer pigment are selected such that the structured polymer pigment exhibits a shear modulus of at least $5.0\times10^9$ dynes/$cm^2$.

The soft domain of the structured polymer pigment preferably exhibits a low $T_g$ of less than about 50° C., more preferably about −10 to +50° C., most preferably 5 to 35° C. The hard domain of the structured polymer pigment typically exhibits a high $T_g$ of greater than about 55° C., more preferably greater than about 80° C.

The particle size of suitable structured polymer pigments is generally limited to the size range typically used for pigments in image receptive coatings. Preferably, the particle size of structured polymer pigments ranges from 500 to 5,000 angstroms (Å), more preferably 800 to 2,000 Å, most preferably 800 to 1,400 Å. Structured polymer pigments having smaller particle size tend to improve gloss and smoothness, thereby reducing or eliminating the need for calendering. Structured polymer pigments having particle sizes greater than about 2000 to 5000 Å tend to result in improved porosity but may require calendering to achieve desired levels of gloss and smoothness. Due to the methods of manufacture, suitable structured polymer pigments tend to exhibit monodisperse size distributions, i.e., very narrow size distributions with little variation from the targeted particle size. Blends of structured polymer pigments having different particle sizes may be used in the image receptive coating.

The image receptive coating typically exhibits multiple glass transition temperatures because each polymeric component provides a glass transition temperature. An image receptive coating including a hard polymer pigment and a film forming binder typically exhibits two glass transition temperatures when the hard polymer pigment is homogeneous, and three or more glass transition temperatures when the hard polymer pigment is heterogeneous. The further addition of a structured polymer pigment to the image receptive coating tends to result in at least two more glass transition temperatures. When a structured polymer pigment is also used in the image receptive coating, the $T_g$ of the binder may be higher or lower than the low $T_g$ soft domain of the structured polymer pigment.

A typical temperature for drying the image receptive coating generally falls between the glass transition temperatures of the hard polymer pigment and the film forming binder. Preferably the $T_g$ of the film forming binder falls within the range of −10 to +35° C., more preferably 5 to 25° C.

The image receptive coating may further include conventional inorganic and organic pigments in addition to the hard polymer pigment. Suitable pigments include kaolin, calcined clay, structured clay, ground calcium carbonate, precipitated calcium carbonate, titanium dioxide, aluminum trihydrate, satin white, hollow sphere plastic pigment, solid plastic pigment, silica, zinc oxide, barium sulfate and mixtures thereof. Preferably the pigments include kaolin, ground calcium carbonate, precipitated calcium carbonate and mixtures thereof. The average particle size, e.g., 0.4 to 2.0 micrometers, and size distribution of these pigments are typical for pigments used as coating pigments. Practitioners skilled in the art are aware of how to select the appropriate coating pigments to achieve the desired final product attributes.

The image receptive coating may include less than about 70 parts by weight of additional pigment, i.e., structured polymer pigments and conventional inorganic and organic pigments combined, based on 100 parts by weight of total pigment. Preferably, the image receptive coating includes less than about 50 parts by weight of additional pigment, more preferably less than about 20 parts by weight, based on 100 parts by weight of total pigment.

The image receptive coating may further include optical-related coating additives, such as colorants, tinting dyes, fluorescent brighteners, blooming agents and mixtures thereof. Practitioners skilled in the art are aware of how to select the appropriate optical package to achieve the desired final product attributes, such as shade and brightness.

The image receptive coating may further include coating additives, such as dispersants, thickeners, defoamers, water retention agents, preservatives, crosslinkers, lubricants and pH control agents. Practitioners skilled in the art are aware of how to select the appropriate coating additives to meet manufacturing and production objectives, e.g., to control foam, rheology, and dusting, and to achieve the desired final product attributes.

The substrate is preferably a paper substrate of a weight and type suitable for offset printing. The basis weight of suitable substrates before application of a coating layer typically ranges from about 35 to 325 g/m$^2$, preferably about 65 to 220 g/m$^2$. Preferably the ash content of the substrate, i.e., the amount of inorganic material incorporated within the substrate, including virgin pigment material and pigment material derived from a recycled fiber component of the substrate, is about 10 to 20% more preferably about 12 to 15%. If the ash content of the substrate is too high, the stiffness of the substrate may decrease significantly. If the ash content is too low, the optical properties, e.g., opacity and brightness, of the sheet may be adversely affected, and the cost of production may increase.

Preferably, the substrate prior to coating with the image receptive layer exhibits a smoothness of less than about 3.5 $\mu$m, more preferably the substrate has a smoothness of less than about 2.0 $\mu$m, most preferably less than about 1.5 $\mu$m, (as measured by the Parker Print Surf instrument at the 10 kg Soft setting). A lower value indicates a smoother surface. A substrate with a smooth surface is desirable because the image receptive coating tends to have a relatively low coat weight and coating thickness. If a relatively rough substrate is used, the image receptive coating may not cover the substrate surface sufficiently and exhibit the level of smoothness desired for the printing sheet. Moreover, a subsequent calendering step may be avoided if the substrate is sufficiently smooth before the coating is applied.

The desired level of smoothness may be achieved through the application of one or more intermediate precoat layers underlying the image receptive coating layer, or by smoothing the surface of the substrate itself. As used herein, a precoat layer is defined as any coating layer applied between the substrate and the image receptive layer, including but not limited to a size press layer and a base coat layer. To smooth the surface of the substrate, the substrate may be pressed while still quite moist to improve its smoothness. To minimize loss of bulk, pressing of the substrate should be performed at a moisture level of about 20 to 60% and at a temperature above approximately 100° C. The smoothness of the substrate may also be improved by drying the wet web against a hot, smooth surface.

Calendering of the substrate or the precoated substrate may also be used to achieve the desired levels of smoothness. Preferably the nip pressures range from about 40 to 175 kN/m, the operating roll temperature ranges from about 80 to 200° C., and the incoming web moisture is about 3 to 10%. While the smoothness of the substrate or precoated substrate typically improves with increased calendering, other desirable properties, such as bulk, porosity, opacity and brightness, may be deleteriously affected. Practitioners skilled in the art are aware of how to select the appropriate calendering temperatures and pressures to achieve the desired substrate properties.

As described above, the substrate may include one or more precoat layers to improve smoothness. A precoat layer may also enhance the surface strength of the coating layer, e.g., to resist picking, increase coating holdout (i.e., the ability of the coating to remain on the surface of the substrate rather than striking into the substrate), and improve optical properties of the final printing sheet, such as gloss, opacity and brightness. Because the image receptive coating imparts the desired level of gloss, smoothness, and acceptable porosity, the precoat layer may be used to provide other desirable properties, such as brightness, opacity, and, to some extent, bulk. If multiple precoat layers are used, the composition of the precoat layers may be different to achieve different desirable properties. For example, a first precoat coating composition may be designed to provide bulk (e.g., the coating contains precipitated calcium carbonate having a monodisperse distribution as the primary pigment), while a second precoat coating composition, overlying the first precoat, may be designed to provide smoothness and brightness (e.g., the coating contains primarily fine kaolin as the primary pigment).

The precoat composition may include components not typically used, or used to a limited extent, in the image receptive coating. Preferably, the precoat composition includes a pigment exhibiting a monodisperse distribution, i.e., a relatively narrow particle size distribution, such as precipitated calcium carbonate or hollow sphere plastic pigment. A preferred monodisperse distribution typically has a steepness factor of less than or equal to about 1.75. Steepness factor, as used herein, is defined as the ratio of the average diameter of 75% by weight of the pigment particles to the average diameter of 25% by weight of the pigment particles (D75/D25). The monodisperse pigment may be the sole pigment in the precoat composition. A narrow particle size distribution in the coating tends to improve fiber coverage and to enhance optical properties. If the particle size distribution is too narrow, the application of the coating to the substrate may be negatively affected, e.g., poor coat weight control and blade scratches due to poor water retention of the coating layer. If the particle size distribution is too broad, the particles exhibit more efficient packing within the coating layer which may lead to a more dense, less porous coating resulting in a deterioration of fiber coverage. A monodisperse pigment gives the precoat a very bulky structure, i.e., more voids between the pigment particles, leading to higher brightness, opacity and bulk. Additionally, because the precoat is not constrained by gloss requirements, the particle size of the pigment may be optimized for light scattering, e.g., opacity, rather than for light reflectance, e.g., gloss.

Suitable pigments for the precoat include kaolin, calcined clay, structured clay, ground calcium carbonate, precipitated calcium carbonate, titanium dioxide, aluminum trihydrate, satin white, hollow sphere plastic pigment, solid plastic pigment, silica, zinc oxide, barium sulfate and mixtures thereof. Preferably the precoat includes a pigment selected from the group consisting of precipitated calcium carbonate, hollow sphere plastic pigment and mixtures thereof. More preferably, the precoat includes precipitated calcium carbonate as the sole pigment.

Precipitated calcium carbonates are commercially available in a broad range of surface areas, average particle sizes and particle size distributions. Typically the equivalent spherical diameter (ESD) of the precipitated calcium carbonate particles is less than about 3 $\mu$m. Preferably about 80 to 95% by weight of the calcium carbonate particles have an ESD of less than about 1 $\mu$m and the average ESD is about 0.4 to 0.9 $\mu$m.

Precipitated calcium carbonates are commercially available in an array of particle shapes. Preferably the precipitated calcium carbonates will exhibit a rhombohedral shape. Suitable precipitated calcium carbonates are manufactured by J. M. Huber Corporation, Specialty Minerals, Inc. and Imerys Pigments, Inc.

Suitable plastic pigments are available as hollow or solid spheres in a range of particle sizes and, in the case of hollow sphere pigments, void volumes. Typically, the average particle size of solid plastic pigments ranges from 0.13 to 0.50 $\mu$m. Suitable solid sphere plastic pigments are commercially available from The Dow Chemical Company, e.g., 722HS, 788A and 756A, and from Omnova Solutions, Inc., e.g., Lytron 2203. For hollow sphere plastic pigments, the average particle size typically ranges from about 0.5 to 1.0 μm with a shell thickness of about 0.06 to 0.09 μm. The hollow core diameter typically ranges from about 0.38 to 0.82 μm, resulting in void volumes of about 43% to 55%. Preferred hollow sphere plastic pigments have an average particle size of about 0.5 to 1.0 μm and a void volume of about 50% to 55%. Suitable hollow sphere plastic pigments are commercially available from Rohm and Haas Company, e.g., Ropaque HP-1055 and Ropaque HP-543P, and from The Dow Chemical Company, e.g., HS2000NA and HS3000NA.

The precoat may further include binders, such as latex, starch, polyacrylate salt, polyvinyl alcohol, protein (e.g., soy, casein), carboxymethyl cellulose, and hydroxymethyl cellulose, and coating additives, such as colorants, tinting dyes, fluorescent brighteners, blooming agents, dispersants, thickeners, defoamers, water retention agents, preservatives, crosslinkers, lubricants and pH control agents. Practitioners skilled in the art are aware of how to select the appropriate binder and coating additives to meet manufacturing and production objectives and to achieve the desired final product attributes.

The image receptive coating is applied using typical paper coating equipment methods. Examples of suitable coating techniques include an applicator means, e.g., applicator roll, fountain, jet, short dwell, slotted die, and curtain, and/or a metering means, e.g., bent blade, bevel blade, rod, roll, air knife, bar, gravure, size press (conventional or metering), and air brush. Preferably, the coating layer is applied by a bevel blade/short dwell coater. Preferably the total coat weight applied per side is about 1 to 4 g/m$^2$, more preferably about 1.5 to 2 g/m$^2$. The solids level of the coating will typically range from about 35 to 55%, preferably 40 to 50%; a lower solids level is typically used to apply a coating at a low coat weight. Preferably the coating is applied to both sides of the substrate to ensure that the printed images on both sides of the printing sheet are of comparable quality. The image receptive coating may be applied to one or both sides of the substrate in more than one coating layer. The coating layer is then dried, e.g., by convection, conduction, radiation, or combinations thereof. The temperature of the paper surface during drying should not exceed the $T_g$ of the hard polymer pigment or the hard polymer domain of the structured polymer pigment if present in the image receptive coating.

The precoat layer is applied to the substrate prior to the application of the image receptive layer. The precoat layer is applied in a similar manner as the image receptive layer as described above. Preferably, the precoat layer is applied by a bent blade/applicator roll coater. The precoat may be applied in one or more layers. Preferably the total coat weight applied per side is about 5 to 15 g/m$^2$, more preferably about 7 to 10 g/m$^2$.

The amount of precoat initially applied to the substrate depends somewhat on the roughness of the underlying substrate. The precoat layer may not be necessary if the substrate has adequate smoothness such that, after application of the image receptive coating, the final printing sheet smoothness meets the desired levels. At a minimum, the precoat layer generally should be thick enough to fill in the valleys of the substrate's surface after drying, taking into account that some shrinkage of the precoat will occur upon drying. On the other hand, if too much precoat is initially applied to the substrate, the substrate may absorb an excessive amount of water from the precoat, causing the fibers to swell and move within the substrate. Such fiber swelling and movement can negatively affect smoothness. The solids level of the precoat will typically range from about 55 to 70%. Preferably the precoat is applied to both sides of the substrate. The precoat layer is then dried, e.g., by convection, conduction, infrared, or combinations thereof. The drying temperature for the precoat layer is not restricted.

As discussed above, if increased smoothness is desired, the precoated substrate may be calendered before the image receptive layer is applied. Alternatively, an additional precoat layer may be applied. Subsequent precoat layers typically have negligible, or no, effect on the substrate's tendency to absorb water and swell. Such absorption typically occurs during the first precoat application.

The printing sheet of the invention exhibits satisfactory levels of gloss, smoothness, bulk, stiffness and opacity without the need for calendering or other finishing steps. If calendering is desired it may be performed after the image receptive coating has been applied and dried. The calendering apparatus may be a separate supercalender, an off-line soft-nip calender, or an on-line soft-nip calendering unit. The level of calendering performed on the sheet is dependent on the desired product attributes, such as paper gloss and sheet bulk. Because the image receptive coating layer is responsive to calendering, i.e., develops gloss and smoothness easily, much lower operating conditions, e.g., temperature and pressure, are necessary during calendering to achieve the desired levels of gloss and smoothness. Preferably the nip pressures range from about 40 to 90 kN/m, the temperature of the paper surface during calendering is preferably at least 5° C. lower than the $T_g$ of the hard polymer pigment, and the incoming web moisture is about 3 to 10%.

A brushing step may be performed after the image receptive coating has been applied and dried. The brusher apparatus may be a separate apparatus, or a process unit in a continuous line. Brushing may be used to achieve the desired levels of paper gloss at a higher bulk than may be achieved through calendering. Brushing intensity is controlled by three variables: brushing area, i.e., the surface area of the coated substrate in contact with the brushes; brushing force, i.e., the tangential force applied by the brushes against the surface of the coated substrate; and brush speed. Net specific brushing intensity is calculated from the net power of the brusher motor, the substrate web speed, and the width of the substrate web. If the brushing intensity is too low, the desired level of gloss and smoothness may not be achieved. If the brushing intensity is too high, the surface of the image receiving layer may be damaged, e.g., scratches and streaks, and/or the surface may coalesce to such an extent that complete film formation occurs deleteriously affecting printing properties. Because the image receptive coating layer is responsive to brushing, i.e., develops gloss and smoothness easily, much lower brushing intensity is necessary during brushing to achieve the desired levels of gloss and smoothness.

Suitable brushers typically have a plurality of brush rolls, e.g., four to eight brush rolls, and are commercially available from DOX Maschinenbau GmbH.

EXAMPLES

Table 1 below provides coating formulation information and final product attribute data for two embodiments of the invention using PMMA as the hard polymer pigment and one comparison example with the coating containing polystyrene particles as the pigment. Two different particles sizes for hard polymer pigment were evaluated in Examples B and C. The $T_g$ of the PMMA pigment was approximately 128° C. and the $T_g$ of the polystyrene particles was approximately 100° C.

Figure 2:
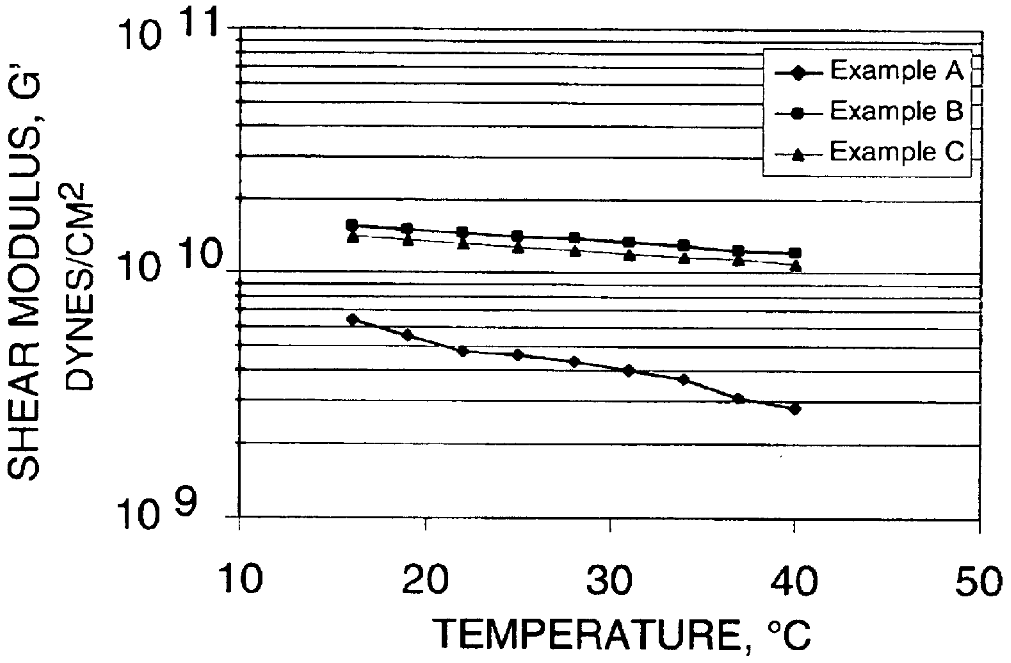
FIG. 2 is a graph of shear modulus, G', as a function of temperature.

FIG. 2 graphs shear modulus, G', as a function of temperature for Examples A, B, and C. The shear modulus of the pigments was determined using a dynamic mechanical analysis (DMA) instrument, Model RDS II manufactured by Rheometric Scientific of Piscataway, N.J. Suitable DMA instruments are also available from TA Instruments of New Castle, Del. To measure shear modulus, a sample of the pigment material is prepared by drying the material on a hot plate at 50° C. and by subjecting the resulting dried material to compression molding, typically at a temperature of 220° C. and a pressure of 1,400 kg/cm$^2$ for one hour. The dimensions of the resulting rectangular sample are approximately 2 mm×13 mm×50 mm. The sample is held in the instrument between two clamps typically spaced 50 mm apart. The analysis is preformed using torsion rectangular geometry at a frequency of 1 rad/sec through a temperature range of 0 to 50° C., at 3° C. increments. Torsional force is applied to the sample such that the strain is in the linear viscoelastic regime, typically a strain rate of about 0.01 to 0.05%. The strain, or displacement, of the sample is measured and the shear modulus is calculated from the stress-strain curve and the sample dimensions. The shear modulus values provided in Table 1 were calculated at a temperature of 21° C., to simulate the temperatures experienced by coated papers during the printing and subsequent processes.

Prior to application of the image receptive coatings, the examples in Table 1 were precoated and calendered on pilot equipment using a substrate manufactured on a commercial scale paper machine. The substrate had a basis weight of 105 g/m$^2$. The precoat included 100 parts precipitated calcium carbonate, 12 parts carboxylated styrene-butadiene latex as the film forming binder, and other coating additives. The precoated substrate was dried to a moisture content of approximately 4% using a combination of infrared and air flotation dryers. The precoated substrate was then soft-nip calendered one nip per side, at a temperature of 120° C. and a nip pressure of 140 kN/m.

The image receptive coatings included 30 parts of a styrene-butadiene latex per 100 parts by weight of pigment as the film forming binder. The image receptive coatings were applied to one side of the precoated substrate using a laboratory bevel blade coater. The coat weight of the image receptive coatings was 2.25±1.0 g/m$^2$. The coating layer was dried for 5 seconds under an infrared heating unit positioned approximately 8 cm from the coated surface. The surface temperature of the heater was set at 315° C. to ensure the coated surface temperature did not exceed 50° C. The surface temperature of the sheet was measured using a temperature sensitive label applied to the sheet before coating application. Temperature sensitive labels are commercially available from Omega Engineering, Inc. of Stamford, Conn., e.g., Eight Point Irreversible Temperature Indicators, Catalog No. 8MA-100/38. The coated sheets were not calendered.

TABLE 1

| | Example A | Example B | Example C |
|---|---|---|---|
| Formulation: | | | |
| PMMA pigment (parts) | 0 | 100 | 100 |
| Polystyrene pigment (parts) | 100 | 0 | 0 |
| Pigment particle size (Å) | 2,200 | 1,900 | 940 |
| Shear Modulus (dynes/cm$^2$) | $4.95 \times 10^9$ | $14.7 \times 10^9$ | $13.3 \times 10^9$ |

TABLE 1-continued

| | Example A | Example B | Example C |
|---|---|---|---|
| Product Attributes: | | | |
| 75° Gloss | 62.0 | 57.5 | 69.6 |
| PPS Smoothness (10 kg Soft) | 0.81 | 0.56 | 0.62 |
| Porosity (Sheffield) (ml/min) | 6.1 | 4.7 | 4.1 |
| Burnish Resistance | Very Poor | Very Good | Very Good |

The measurements for 75° gloss were performed in accordance with Tappi Method T-480 om-99. A glossier coated paper surface is indicated by a higher 75° gloss value. Parker Print Surf (PPS) is a measure of the smoothness of the surface, with a lower value indicating a smoother surface. PPS measurements were performed according to Tappi Method T-555 om-94. The Sheffield porosity measurements were performed in accordance with Tappi Method T-547 om-97, using a 27 mm diameter orifice. Higher Sheffield porosity values indicate greater flow through the paper, which typically provides improved ink setting and blister resistance.

The following test was developed to measure burnish resistance of a coated sheet. In brief, a weighted sled is dragged across the surface of a sample and the resulting burnish mark, if any, is evaluated. The weighted sled is a steel cylinder having a diameter of 6.6 cm, a height of approximately 12 cm and a weight of 3.07 kg. One end of the cylinder is covered with napped polishing cloth (e.g., Buehler Microcloth, catalog number 40-7218). A thin wire is attached to the side of the cylinder with a screw eye. The test is performed on a paper sample having dimensions of at least 8 cm by 25 cm wherein the machine direction of the paper is parallel with the short dimension. The sample is attached to a flat, smooth, incompressible surface. The sled is placed on one end of the paper sample with the polishing cloth against the surface of the test sample. The sled is pulled by the wire along the long dimension of the test sample at a constant rate of 2 cm/sec.

The burnish resistance of a sample is determined by visually comparing the sample to a set of standards. The standards are rated very poor, poor, fair, good, very good or excellent, with a rating of excellent signifying no burnishing and a rating of very poor signifying significant, and unacceptable, burnishing. Five handsheet samples for each example in Table 1 were prepared and rated against the set of standards. Samples with low burnish resistance tend to have burnish ratings of poor and very poor. Samples exhibiting resistance to burnishing tend to have burnish ratings of fair to very good. Coated printing papers having coatings consisting primarily of mineral pigments typically have burnish ratings of good to excellent.

The product attributes provided in Table 1 are typically used to differentiate between coated printing sheets for offset printing. Generally, glossy coated printing papers suitable for offset printing exhibit 75° gloss greater than about 65.0 and PPS smoothness less than about 1.20. The data in Table 1 indicates that Examples B and C with hard polymer pigment in the image receptive coating exhibit the product attributes generally desired for offset printing and very good burnish resistance. The 75° gloss level of Example B demonstrates the effect of the larger particle size of the hard polymer pigment. As discussed above, hard polymer pigments having larger particle size may be used for low gloss grades of paper. Example A with polystyrene particles as the pigment does not exhibit acceptable burnish resistance.

Table 2 below provides coating formulation information and final product attribute data for three embodiments of the invention using the same grade of PMMA used in Example C as the hard polymer pigment and a modified styrene/butadiene latex as the film forming binder. Example F also contains a structured polymer pigment as an additional pigment. The structured polymer pigment is composed of primarily methyl methacrylate and butadiene.

The examples in Table 2 were produced on a pilot coater using a substrate manufactured on a commercial scale paper machine. The substrate had a basis weight of 84 g/m$^2$. A precoat was applied to each side of the substrate at a coat weight of approximately 10 g/m$^2$ per side. The precoat included 100 parts precipitated calcium carbonate, 12 parts carboxylated styrene-butadiene latex as the film forming binder, and other coating additives. The precoated substrate was dried to a moisture content of approximately 4% using a combination of infrared and air flotation dryers. The precoated substrate was then soft nip calendered one nip per side, at a temperature of 120° C. and a nip pressure of 88 kN/m. The smoothness of the precoated substrate for each example in Table 2 was 1.3 to 1.6.

The image receptive coatings were applied to both sides of the precoated substrates using a short dwell bevel blade coater. The coat weight of the image receptive coatings was 2.5±1.0 g/m$^2$. The resulting coated papers were dried to a moisture content of approximately 4% using a combination of infrared and air flotation dryers. The coated papers were not calendered after application of the image receptive coatings.

TABLE 2

| | Example D | Example E | Example F |
|---|---|---|---|
| Formulation: | | | |
| Hard Polymer Pigment (parts) | 100 | 100 | 62 |
| Structured Polymer (parts) | 0 | 0 | 38 |
| Film Forming Binder (parts) | 25 | 56 | 18 |
| Product Attributes: | | | |
| Specific Volume (cm$^3$/g) | 0.93 | 0.97 | 0.98 |
| Porosity (Sheffield) (ml/min) | 21.8 | 3.4 | 26.3 |
| PPS Smoothness (10 kg Soft) | 0.95 | 1.03 | 1.09 |
| L&W Stiffness (MD/CD)[1] | 36.6/18.2 | 26.8/18.4 | 36.1/18.3 |
| 75° Gloss | 70.1 | 72.2 | 66.8 |
| Brightness | 88.6 | 88.5 | 88.8 |
| Opacity | 94.3 | 94.5 | 94.8 |
| 75° Ink Gloss (Air Dry) | 65.3 | 88.7 | 68.8 |
| Burnish Resistance | Fair | Good | Good |

Note: 1. Bending force in mN.

Several of the tests listed in Table 2 are described above with reference to Table 1. Specific volume is calculated by dividing the caliper, i.e., thickness, of the sheet by the basis weight of the sheet. Basis weight is the weight of a specified area of paper, typically expressed in grams per square meter. Specific volume provides an indication of the bulk or density of a printing paper. A dense sheet will exhibit a low specific volume value while a bulkier sheet will exhibit a high specific volume value for the same basis weight. Specific volumes of 0.75 to 0.90 are typically exhibited by coated printing papers. Because printing sheets are generally priced by basis weight, the ability to provide sheets with higher specific volume is generally desirable because it may decrease the cost of the paper to the customer. Because they have a high specific volume, the printing sheets of the invention with a basis weight of, for example, 90 g/m$^2$, provide some of the physical attributes of a sheet with a higher basis weight, e.g., 100 g/m$^2$, such as stiffness and bulk. In addition, the printing sheets of the invention maintain other desirable product attributes such as gloss and smoothness. Therefore, the customer pays a lower price for the lower basis weight but receives the product quality attributes of a higher basis weight sheet.

The measurements for Lorentzen & Wettre (L&W) stiffness were performed according to method DIN-53-1221. L&W stiffness is the bending force which results when a sample is subjected to a bending angle of 15°, and a higher value indicates greater stiffness. Opacity and brightness measurements were performed according to Tappi Methods T-425 and T-452 om-87, respectively.

The 75° gloss measurements for paper gloss and ink gloss were performed according to Tappi Method T-480 om-99. For gloss, the higher the value, the greater is the gloss of the paper or printed image. Samples for the ink gloss measurements were prepared by printing the paper sample with a solid image on a laboratory printing press, using the dry offset method. The resulting ink film was dried for 24 hours in a controlled environment typical of pressroom conditions, e.g., 21° C. temperature and 50% humidity. The dried ink film was then measured for 75° gloss. Because laboratory printing equipment, test inks and sample preparation methods may vary, the ink gloss values in Table 2 are presented for comparison purposes only. Practitioners skilled in the art of printing are aware of how to prepare an ink film on paper for measuring ink gloss.

The final product attribute values shown in Table 2 are considered very good for printing sheets without the use of calendering. The lower Sheffield porosity exhibited by Example E is caused by the increased amount of film forming binder in the image receptive coating. Because Sheffield porosity values can also be affected by processing variables other than the composition of the image receptive coating, comparisons of the Sheffield porosity of experimental samples may be valid only within the context of a particular experiment. The values of Sheffield porosity provided in Table 2 are considered acceptable for experimental samples. The embodiments of the invention provided in Table 2 exhibit fair to good burnish resistance.

Table 3 below provides process information and product attribute data for four embodiments of the invention. Product attribute data is provided for both the precoated intermediate product and the final product. The image receptive coatings include 100 parts of the same grade of PMMA used in Example C as the hard polymer pigment and 56 parts of a modified styrene-butadiene latex as the film forming binder. The examples in Table 3 were produced on a pilot coater using a substrate manufactured on a commercial scale paper machine. The substrate had a basis weight of 56 g/m$^2$. A first precoat layer was applied to each side of the substrate at a coat weight of approximately 7.5 g/m$^2$ per side.

The precoat layer for Examples G and H included 75 parts structured clay, 25 parts precipitated calcium carbonate, 15 parts carboxylated styrene-butadiene latex as the binder, and other coating additives. The precoat layer for Examples I and J included 100 parts ground calcium carbonate, 15 parts carboxylated styrene/butadiene latex as the binder, and other coating additives.

Examples I and J were further coated with a second precoat layer. The second precoat layer was applied to each side of the substrate at a coat weight of approximately 4.5 g/m$^2$ per side. The second precoat included 73 parts structured clay, 23 parts precipitated calcium carbonate, and 4 parts solid plastic pigment as the pigments, 10 parts carboxylated styrene-butadiene latex and 3 parts ethylated starch as the binder, and other coating additives. The precoated substrates for all examples were then dried to a moisture content of approximately 4% using air flotation dryers.

The precoated substrates of Example H and Example J were soft-nip calendered one nip per side, after the first precoat layer and second precoat layer respectively. Example H was calendered at a temperature of 150° C. and a nip pressure of 140 kN/m, while Example J was calendered at a temperature of 150° C. and a nip pressure of 88 kN/m.

The image receptive coatings were applied to both sides of the precoated substrates using a short dwell bevel blade coater. The coat weight of the image receptive coatings was 2.2±1.2 g/m$^2$ per side. The resulting coated papers were dried to a moisture content of approximately 4% using air flotation dryers. The coated papers were not calendered after application of the image receptive coatings.

TABLE 3

| | Example G | Example H | Example I | Example J |
|---|---|---|---|---|
| Process Conditions: | | | | |
| 1$^{st}$ Precoat Weight (g/m$^2$, per side) | 7.5 | 7.5 | 7.5 | 7.5 |
| 2$^{nd}$ Precoat Weight (g/m$^2$, per side) | N/A | N/A | 4.5 | 4.5 |
| Precoat Nip Pressure (kN/m) | N/A | 140 | N/A | 88 |
| Precoat Attributes:[1] | | | | |
| Specific Volume (cm$^3$/g) | 1.10 | 0.97 | 1.00 | 0.92 |
| Porosity (Sheffield) (ml/min) | 40.7 | 24.9 | 13.1 | 10.2 |
| PPS Smoothness (10 kg Soft) | 3.39 | 1.38 | 2.27 | 1.56 |
| Final Product Attributes: | | | | |
| Basis Weight (g/m$^2$) | 75.9 | 73.6 | 83.0 | 85.1 |
| Specific Volume (cm$^3$/g) | 1.03 | 0.97 | 0.96 | 0.91 |
| Porosity (Sheffield) (ml/min) | 1.73 | 2.8 | 0.33 | 0.1 |
| PPS Smoothness (10 kg Soft) | 1.46 | 0.88 | 1.22 | 1.15 |
| L&W Stiffness (MD/CD)[2] | 11.6/6.3 | 8.9/4.9 | 13.6/7.5 | 12.1/7.6 |
| 75° Gloss | 59.7 | 72.6 | 70.2 | 79.1 |
| Brightness | 85.7 | 85.3 | 86.4 | 86.8 |
| Opacity | 90.2 | 89.2 | 91.1 | 90.5 |
| 75° Ink Gloss (Heat Set) | 79.5 | 90.5 | 87.8 | 91.1 |
| Burnish Resistance | Good | Fair | Good | Good |

Note:
[1]Precoat Attributes for Examples I and J were measured after the second precoat layer. Precoat Attributes for Examples H and J were measured after calendering.
[2]Bending force in mN.

Most of the tests listed in Table 3 are described above with reference to Tables 1 and 2. Samples for the heat set ink gloss measurements were prepared as described above for the air-dry ink gloss measurements. The resulting ink film was dried under conditions simulating an oven used in web offset printers, e.g. the printed paper is heated to a temperature of 135° C. within 3 seconds and immediately removed from the heat source. The ink film was further dried for 24 hours in a controlled environment typical of pressroom conditions, e.g., 21° C. temperature and 50% humidity. The dried ink film was then measured for 75° gloss. As in the case of the air-dry ink gloss values provided in Table 2, the heat set ink gloss values in Table 3 are presented for comparison purposes only.

The examples provided in Table 3 demonstrate different methods that may be used to manufacture the coated printing sheet of the invention. The final product attribute values shown in Table 3 are considered very good for printing sheets without the need to calender the image receptive coated product. Examples I and J demonstrate that certain final product attributes may be improved with the use of a second precoat layer prior to application of the image receptive coating layer. Examples H and J demonstrate that calendering of the precoat layer immediately underlying the image receptive layer may also improve final product attributes. As discussed above, comparisons of the Sheffield porosity of experimental samples may be valid only within the context of a particular experiment. The Sheffield porosity values provided in Table 3 are considered acceptable. Embodiments of the invention provided in Table 3 exhibit fair to good burnish resistance.

Other embodiments are within the claims. Various modifications of this invention will become apparent to those skilled in the art without departing from the scope or spirit of this invention.

What is claimed is:

1. A printing sheet comprising a substrate and, on at least a first surface of the substrate, an image receptive coating layer comprising a polymer pigment having a shear modulus of at least 5.0×10$^9$ dynes/cm$^2$ and a film forming binder.

2. A printing sheet of claim 1 wherein the polymer pigment has a shear modulus of at least 10.0×10$^9$ dynes/cm$^2$.

3. A printing sheet of claim 1 wherein the polymer pigment is essentially non-film forming and remains in a form of discrete spherical solid particles in the image receptive coating layer.

4. A printing sheet of claim 1 wherein the polymer pigment exhibits a glass transition temperature of at least 80° C.

5. A printing sheet of claim 4 wherein the polymer pigment exhibits a glass transition temperature of at least 105° C.

6. A printing sheet of claim 1 wherein the polymer pigment is selected from the group consisting of poly (methyl methacrylate), poly(2-chloroethyl methacrylate), poly(isopropyl methacrylate), poly(phenyl methacrylate), polyacrylonitrile, polymethacrylonitrile, polycarbonates, polyetheretherketones, polyimides, acetals, polyphenylene sulfides, phenolic resins, melamine resins, urea resins, epoxy resins, and alloys, blends, mixtures and derivatives thereof.

7. A printing sheet of claim 6 wherein the polymer pigment has a homogenous composition comprising poly (methyl methacrylate) particles.

8. A printing sheet of claim 1 wherein the polymer pigment particles have a particle size of less than about 2,000 angstroms (Å).

9. A printing sheet of claim 8 wherein the polymer pigment particles have a particle size of less than about 1,500 Å.

10. A printing sheet of claim 9 wherein the polymer pigment particles have a particle size ranging from about 600 to 1,200 Å.

11. A printing sheet of claim 1 wherein the image receptive coating comprises at least 30 parts by weight of the polymer pigment, based on 100 parts by weight of total pigment.

12. A printing sheet of claim 11 wherein the image receptive coating comprises at least 50 parts by weight of the polymer pigment, based on 100 parts by weight of total pigment.

13. A printing sheet of claim 12 wherein the image receptive coating comprises at least 80 parts by weight of the polymer pigment, based on 100 parts by weight of total pigment.

14. A printing sheet of claim 1 wherein the film forming binder is selected from the group consisting of latex, starch, polyacrylate salt, polyvinyl alcohol, soy, casein, carboxymethyl cellulose, hydroxymethyl cellulose and mixtures thereof.

15. A printing sheet of claim 14 wherein the film forming binder is a latex selected from the group consisting of styrene-butadiene, styrene-butadiene-acrylonitrile, styrene-acrylic, styrene-butadiene-acrylic and mixtures thereof.

16. A printing sheet of claim 1 wherein the image receptive coating comprises 5 to 75 parts by weight of the film forming binder, based on 100 parts by weight of total pigment.

17. A printing sheet of claim 1 wherein the image receptive coating further comprises a pigment selected from the group consisting of structured polymer pigment, kaolin, calcined clay, structured clay, ground calcium carbonate, precipitated calcium carbonate, titanium dioxide, aluminum trihydrate, satin white, hollow-sphere plastic pigment, solid plastic pigment, silica, zinc oxide, barium sulfate and mixtures thereof.

18. A printing sheet of claim 17 wherein the image receptive coating further comprises structured polymer pigment consisting of a soft domain having a glass transition temperature of less than about 50° C. and a hard domain having a glass transition temperature of greater than about 55° C.

19. A printing sheet of claim 1 wherein the image receptive coating has a total dried coat weight per side of about 1 to 4 g/m$^2$.

20. A printing sheet of claim 1 wherein the substrate, prior to application of the image receptive coating, has a smoothness of less than about 3.5 $\mu$m.

21. A printing sheet of claim 20 wherein the smoothness of the substrate is less than about 2.0 $\mu$m.

22. A printing sheet of claim 21 wherein the smoothness of the substrate is less than about 1.5 $\mu$m.

23. A printing sheet of claim 1 wherein the printing sheet further comprises at least one precoat layer on the first surface of the substrate underlying the image receptive coating layer.

24. A printing sheet of claim 23 wherein the precoat layer comprises a binder and a pigment selected from the group consisting of kaolin, calcined clay, structured clay, ground calcium carbonate, precipitated calcium carbonate, titanium dioxide, aluminum trihydrate, satin white, hollow sphere plastic pigment, solid plastic pigment, silica, zinc oxide, barium sulfate and mixtures thereof.

25. A printing sheet of claim 24 wherein the pigment has a monodisperse particle size distribution.

26. A printing sheet of claim 25 wherein the monodisperse pigment is selected from the group consisting of precipitated calcium carbonate, hollow sphere plastic pigment and mixtures thereof.

27. A printing sheet of claim 23 wherein the precoat layer has a total dried coat weight per side of about 5 to 15 g/m$^2$.

* * * * *